United States Patent [19]

Bolin

[11] 4,064,353
[45] Dec. 20, 1977

[54] GAS INSULATED TRANSMISSION LINE WITH PARTICLE TRAP

[75] Inventor: Philip C. Bolin, Northborough, Mass.

[73] Assignee: Westinghouse Electric Corporation, Pittsburgh, Pa.

[21] Appl. No.: 723,270

[22] Filed: Sept. 15, 1976

[51] Int. Cl.² ............................................. H01B 9/00
[52] U.S. Cl. ................................ 174/14 R; 174/16 B; 174/28
[58] Field of Search ................... 174/14 R, 16 B, 28, 174/29, 88 B, 99 B

[56] References Cited

U.S. PATENT DOCUMENTS

| 3,767,837 | 10/1973 | Graybill | 174/28 X |
| 3,895,176 | 7/1975 | Cookson et al. | 174/28 |
| 3,898,367 | 8/1975 | Nakata | 174/28 X |
| 4,029,891 | 6/1977 | Nakata | 174/14 R |

FOREIGN PATENT DOCUMENTS 2,422,961   10/1975   Germany ........................ 174/14 R Primary Examiner—Arthur T. Grimley
Attorney, Agent, or Firm—M. S. Yatsko

[57] ABSTRACT

A gas insulated transmission line including an outer sheath at low potential, an inner conductor within the sheath at high potential, and an insulating gas within the outer sheath between the outer sheath and the inner conductor. Also included are insulators for supporting the inner conductor within the outer sheath, and particle trapping means for entrapping any particle present within the outer sheath. The particle trapping means includes an apertured electrode positioned next to, and coupled to the interior surface of the outer sheath, and deflector means associated with the apertures for deflecting any particles which may pass through the apertures to an area between the solid electrode surface and the outer sheath.

10 Claims, 6 Drawing Figures

GAS INSULATED TRANSMISSION LINE WITH PARTICLE TRAP

BACKGROUND OF THE INVENTION

This invention relates generally to high voltage transmission lines and more particular to a gas insulated transmission line having a particle trap including deflector means.

A gas insulated transmission line typically comprises a grounded metal sheath, a high voltage conductor within the sheath, insulators maintaining the conductor spaced from the sheath, and a compressed gas such as sulfur hexafluoride between the conductor and the sheath for the purpose of maintaining a high dielectric strength therebetween. It has been recognized, though, that loose solid conductive or semiconductive particles in the compressed gas can impair its dielectric strength and also the dielectric strength along the surface of the insulator. To eliminate the problem caused by these particles, various means have been utilized to remove or deactivate them. U.S. Pat. Nos. 3,515,939 — Trump; 3,792,188 — Cronin; 3,813,475 — Cronin; and 3,898,367 — Nakata are various means utilized in the prior art to deactivate these particles. All these patents describe a method of providing a low or zero field region near the outer metallic sheath as a means of entrapping the particles. The particles which move in the electrical field and may travel back and forth between the outer sheath and the inner conductor eventually find their way into the low field region, where they are trapped. The low field region traps these particles because the force acting on the particle which would cause it to leave the outer sheath and travel through the gas to the inner conductor is equal to the product of the particle's induced charge and the electric field intensity. However, in the low field region, the electric field intensity is low, which reduces the force causing the particle to leave by a factor equal to the square of the reduction in the electric field intensity.

However, a problem may arise during operation of the transmission line. A high voltage DC current may be impressed upon the typically alternating current being transported along the inner conductor. This DC field may cause the particle to raise off of the outer sheath and travel between the outer sheath and the inner conductor, thereby possibly initiating electrical breakdown. Also, the particles may become dislodged from the low field region by a mechanical shock acting on the outer sheath. This mechanical shock could cause the particles to re-enter the higher field regions, where they may be detrimental to the transmission line. A third manner in which such particles may become dislodged is if, upon installation of the system after initial conditioning of it, the transmission line section is installed incorrectly. If, for example, the transmission line is installed with the trap at the vertical top of the line, the force of gravity may cause the particle to leave the low field region and possibly initiate breakdown. Therefore, it may be desirable to provide some means of insuring that such particles entering low field regions, or particle traps, remain in the traps irregardless of whether mechanical shock, gravity, or direct current fields act upon such particle.

SUMMARY OF THE INVENTION

This invention overcomes the aforementioned problem by providing a gas insulated transmission line including an outer sheath at low potential and an inner conductor disposed within the outer sheath. The inner conductor is at a high potential with respect the outer sheath. Within the outer sheath is disposed an insulating gas, and means for insulatably supporting the inner conductor within the outer sheath. Also included are particle trapping means which include an apertured electrode positioned adjacent to, and electrically coupled to, the interior surface of the outer sheath. The electrode and the outer sheath define a region of low electric field therebetween for the entrapping of particles. Also included are deflector means associated with the apertures, which deflect any particles which may pass through the apertures to an area between the electrode surface and the outer sheath. In this location, the particles are entrapped in an area where the field does not penetrate to, and also an area where the particle cannot easily bounce out of the trapping region.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
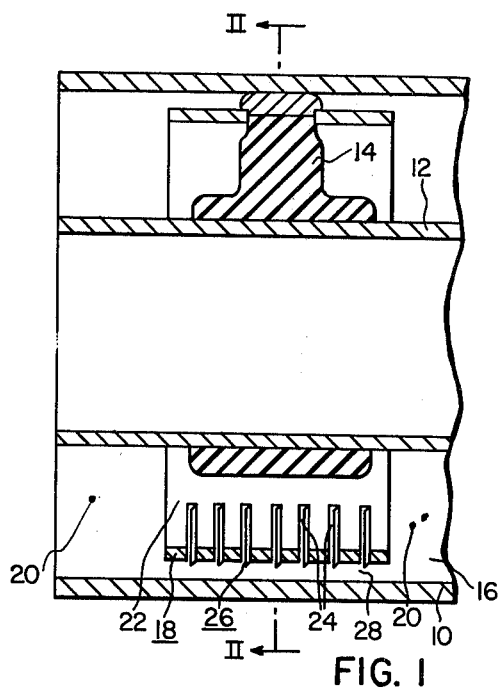
FIG. 1 is a sectional view of a typical compressed gas insulated transmission line of this invention.

Referring now more particularly to FIG. 1, therein is shown a gas insulated transmission line according to the teachings of this invention. Although illustrated as having a single inner conductor, it is to be understood that this invention includes gas insulated transmission lines having a plurality of conductors within the outer sheath. The transmission line comprises a metallic outer sheath 10 which is at low or ground potential, and an inner conductor 12 disposed within the outer sheath 10. The inner conductor 12 is at a high potential with respect to the outer sheath 10, and typically may transmit voltages of 121 kV, 145 kV, 242 kV, 362 kV, 550 kV or 800 kV. Also disposed within the outer sheath 10 is a spacer 14 which insulatably supports the inner conductor 12 within the outer sheath 10. An insulating gas 16, typical of which is sulfur hexafluoride, is disposed within the outer sheath 10 intermediate the sheath 10 and the inner conductor 12. The insulating gas electrically insulates the inner conductor 12 from the outer sheath 10.

Figure 2:
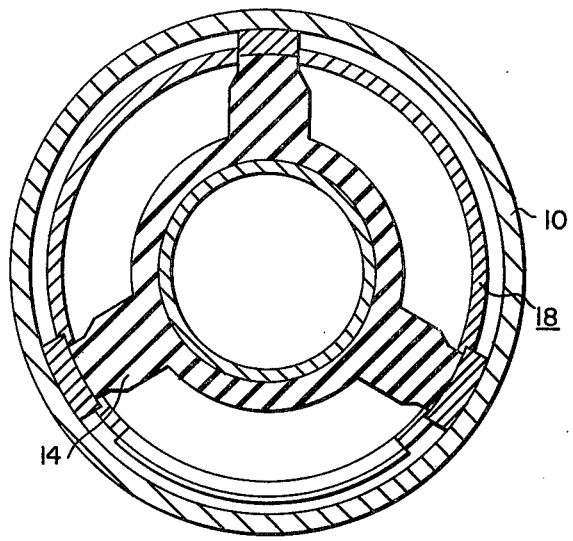
FIG. 2 is an end view of the transmission line of FIG. 1 taken along line II—II of FIG. 1.

Within the outer sheath 10 is disposed particle trapping means 18 which function to trap any particles 20 present within the outer sheath 10. Referring now to FIG. 2, it can be seen that the particle trapping means 18 is held in place within the outer sheath 10 by the insulating spacer 14. Although shown thusly, it is to be understood that the spacer 14 and the particle trap 18 needs not be formed as a unit, but rather the spacer 14 and the particle trap 18 can be separate elements. Also, although the spacer 14 as shown as being comprised of three posts, it is to be understood that conical, disc, or other type of spacers might also be utilized.

The particle trap 18 is comprised of an electrode surface 22, and a plurality of apertures 24 within the electrode surface 22. Although illustrated as being slots, the apertures 24 may be in the form of holes also. Deflector means 26 complete the particle trap 18.

The region 28 between the electrode 22 and the outer sheath 10 comprises a low field region where the particles become inactivated or trapped. Once the particles 20 enter within the low field region 28, they will have insufficient force acting upon them to propel them out of the trapping area 28 and possibly initiate a breakdown of the insulating gas 16.

Figure 3:
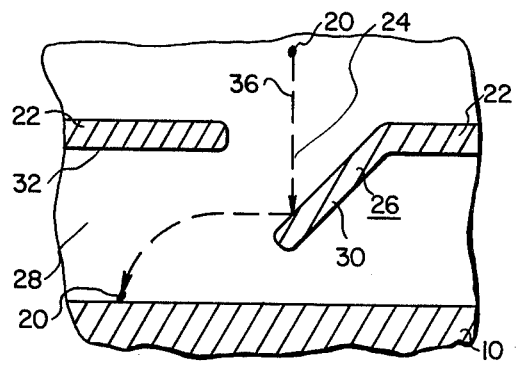
FIG. 3 is an enlarged, detailed view of a portion of the particle trapping means of FIG. 1.

Referring now more particularly to FIG. 3, therein is shown an enlarged view of one of the apertures 24, the electrode surface 22, and the deflector means 26. As shown therein, the deflector means 26 comprises a wall 30 which is connected to the electrode surface 22 and extends towards the outer sheath 10. The wall 30 is inclined at an angle with respect to the electrode and apertures and extends outwardly toward the aperture 24. In this position, any particle 20 which may pass through the aperture 24 strikes the wall 30, and the particle will be deflected to an area in the low field region 28 between the electrode surface 22 and the outer sheath 10, as indicated by the particle path 36 wherein the electric field does not penetrate. In this position, not being directly in line with the aperture 24, if any DC electric field or mechanical shock should occur, the particles 20 if raised, would, rather than exit through the aperture 24, instead strike the outer surface 32 of the electrode 22. Therefore, it would be prevented from leaving the trapping region 28 and re-entering the transmission line system.

The wall 30 of the deflector 26 could be formed, for example, by the material removed from the electrode 22 to make the aperture 24 for the particle 20 entry. This could simplify the fabrication of the particle trap and deflecting means, and thus reduce cost.

Figure 4:
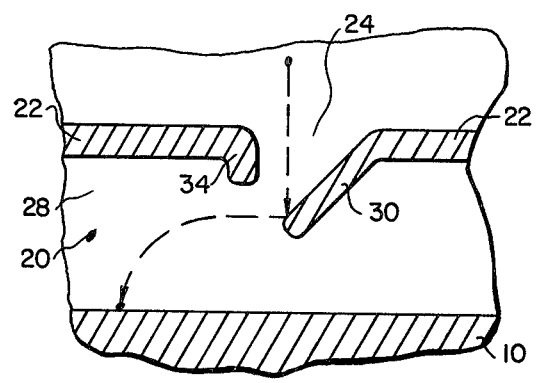
FIG. 4 is a modification of the particle trapping means of FIG. 3.
Figure 5:
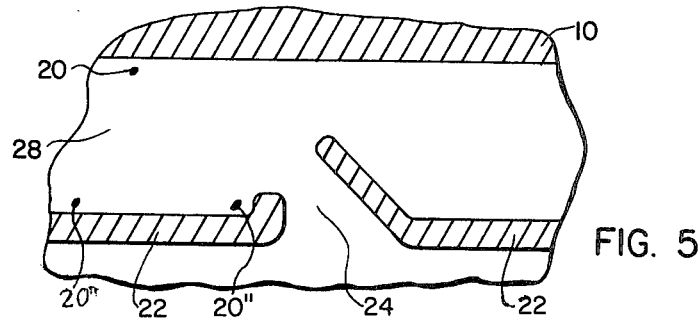
FIG. 5 is a view of the particle trapping means of FIG. 4 rotated 180°.

Referring now to FIG. 4, therein is shown a modification of a view of FIG. 3. In this modification, the electrode 22 has an extension 34 secured thereto. The extension 34 is located adjacent to the aperture 24, and extends toward the outer sheath 10. This extension 34, or baffle, inhibits the passage of any particles 20 which may be present within the low field region 28 between the outer sheath 10 and electrode surface 22 from leaving the trapping region 28. This additional particle inhibiting ability is shown advantageously in FIG. 5. There, the particle trap 18 is oriented incorrectly, rotated 180° from its normal position. In this position, the particle trap is "upside down." This may occur, for example, during installation of the compressed gas insulator transmission line in the field. In this location, gravity would tend, in the prior art particle trap, to cause the particle 20 to fall from within the low field region 28. However, with the extension 34 and deflector wall 30, the particles 20 which had previously been trapped would fall downward to the position illustrated at 20' or 20" and would be prevented from falling out of the aperture 24.

Figure 6:
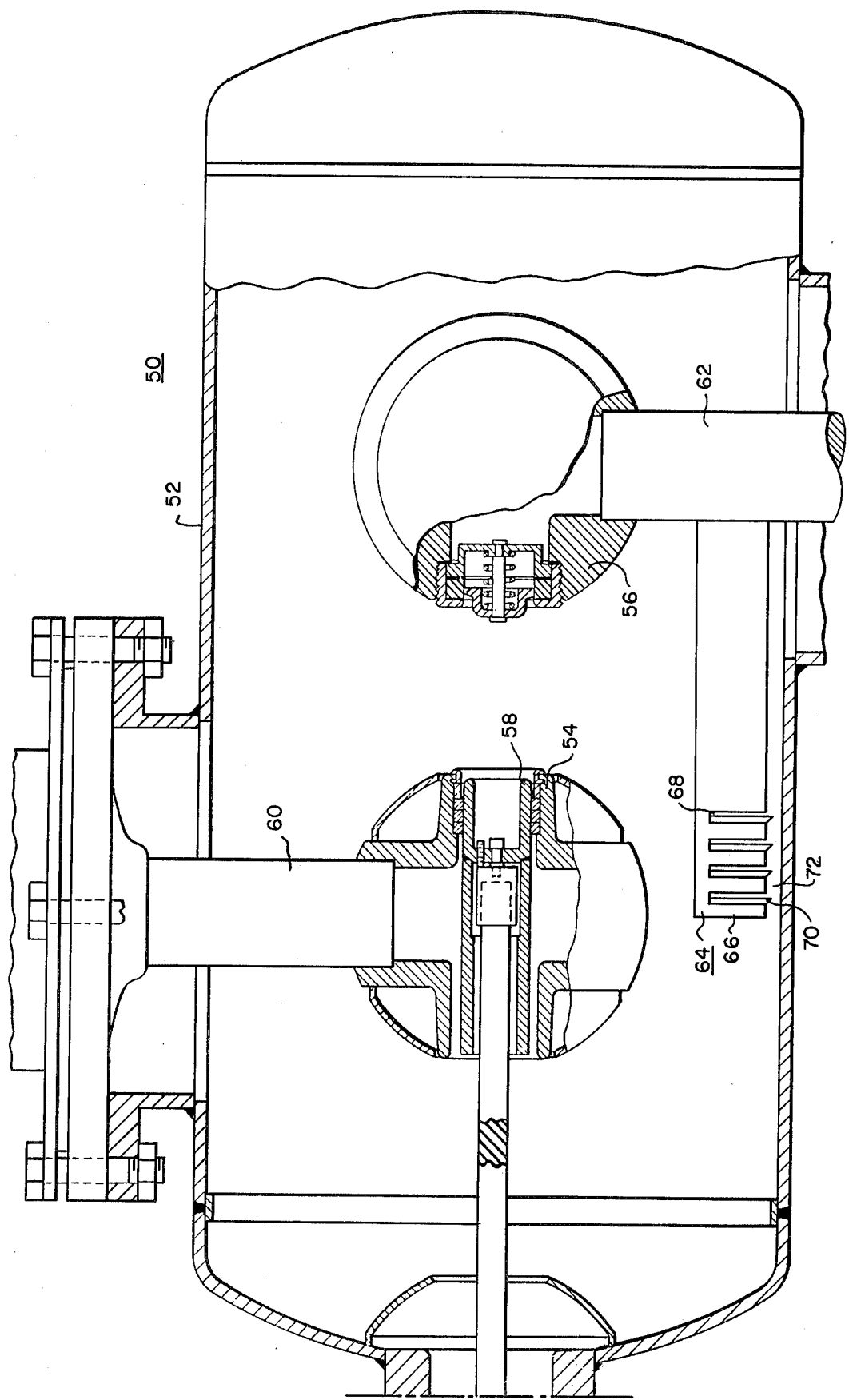
FIG. 6 is a sectional view of electrical apparatus in which the particle trapping means of FIG. 3 may be utilized.

In addition to being useful in gas-insulated transmission lines, the particle trapping means of this invention may be used advantageously in other electrical apparatus such as circuit breakers, magnetizing current switches, disconnect switches, or other gas-insulated apparatus where loose conducting particles may be detrimental. FIG. 6 illustrates one such use in a current-interrupting switch. The switch 50 is comprised of a sealed outer enclosure 52 containing an insulating gas such as sulfur hexafluoride. Disposed within the grounded enclosure 52 are two high voltage electrodes 54 and 56 which may be electrically connected by movable contact 58. The contact 58 is capable of being in two positions; one position in contact with both electrodes 54 and 56; and the other position being with contact 58 spaced apart from electrode 56. The contact 58 is driven by drive means not shown.

The electrodes 54 and 56 are connected through connectors 60, 62 to, for example, sections of a gas-insulated substation. The location of contact 58 with respect to electrode 56 then controls the flow of current between the substation sections connected to connectors 60, 62. The operation of such a switch is described in greater detail in U.S. patent application Ser. No. 649,181, filed Jan. 15, 1976, by J. R. Meyer and assigned to the same assignee as the present invention.

Disposed within the enclosure 52 are particle trapping means 64 similar to those previously described. The particle trap is comprised of the electrode surface 66 and a plurality of apertures 68 within the low-potential electrode surface 66. Deflector means 70 complete the trap 64. As before, any particles present within the enclosure, such as may be generated by the movement of the contact 58 with respect to the high-voltage electrodes 54, 56, will be trapped in the low field region 72 between the electrode surface 66 and the enclosure 52.

Thus, it can be seen that this invention provides an improved particle trap which inactivates conducting or semiconducting particles within a gas insulated transmission line irregardless of direct current electric fields or any mechanical shocks which may occur.

I claim as my invention:

1. A gas insulated transmission line comprising:
   an outer sheath at low potential;
   an inner conductor disposed within said outer sheath, paid inner conductor being at high potential with respect to said outer sheath;
   an insulating gas disposed within said outer sheath intermediate said outer sheath and said inner conductor;
   means for insulatably supporting said inner conductor within said outer sheath; and
   particle trapping means disposed within said outer sheath for entrapping particles present within said outer sheath comprising;
   an apertured electrode positioned adjacent to, and electrically coupled to, the interior surface of said outer sheath, said electrode and said outer sheath defining a region of low electric field for entrapping particles; and
   deflector means associated with said apertures for deflecting any particles passing through said apertures to an area intermediate said electrode surface and said outer sheath.

2. The gas insulated transmission line according to claim 1 wherein said deflector means comprises a wall connected to said electrode and extending towards said outer sheath, said wall being inclined at an angle with respect to said electrode and said apertures, and extending outwardly towards said apertures.

3. The gas insulated transmission line according to claim 1 wherein said apertures are in the form of holes.

4. The gas insulated transmission line according to claim 1 wherein said apertures are in the form of slots.

5. The gas insulated transmission line according to claim 1 including an extension of said electrode positioned adjacent said apertures and extending towards said outer sheath, said extension inhibiting the passage of particles therefrom.

6. The gas insulated transmission line according to claim 1 wherein said insulating gas comprises sulfur hexafluoride.

7. Electrical apparatus comprising:
an outer enclosure at low potential;
a high-voltage electrode disposed within said enclosure, said high-voltage electrode being at high potential with respect to said enclosure;
an insulating gas disposed within said enclosure and electrically insulating said high-voltage electrode from said enclosure; and
particle trapping means disposed within said enclosure for entrapping particles present within said enclosure comprising:
an apertured low-potential electrode positioned adjacent to, and electrically coupled to, the interior surface of said enclosure, said low-potential electrode and said enclosure defining a region of low electric field for entrapping particles; and
deflector means associated with said apertures for deflecting any particles passing through said apertures to an area intermediate said low-potential electrode surface and said enclosure.

8. The apparatus according to claim 7 wherein said deflector means comprises a wall connected to said lowpotential electrode and extending towards said enclosure, said wall being inclined at an angle with respect to said low-potential electrode and said apertures, and extending outwardly towards said apertures.

9. The apparatus according to claim 7 including an extension of said low-potential electrode positioned adjacent said apertures and extending towards said enclosure, said extension inhibiting the passage of particles therefrom.

10. The apparatus according to claim 7 wherein said insulating gas comprises sulfur hexafluoride.

* * * * *